United States Patent [19]
Isbister et al.

[11] 3,971,018
[45] July 20, 1976

[54] MARINE TRAFFIC CONFLICT ASSESSMENT SYSTEM

[75] Inventors: Eric J. Isbister, Greenlawn; James P. O'Sullivan, Sea Cliff, both of N.Y.

[73] Assignee: Sperry Rand Corporation, New York, N.Y.

[22] Filed: June 24, 1974

[21] Appl. No.: 483,182

[52] U.S. Cl. .................. 343/5 CD; 343/5 EM; 343/7.3; 343/112 CA
[51] Int. Cl.² .................................. G01S 9/02
[58] Field of Search ............ 343/5 CD, 5 EM, 5 ST, 343/7.3, 112 CA, 112 TC

[56] References Cited
UNITED STATES PATENTS

| | | | |
|---|---|---|---|
| 3,188,631 | 6/1965 | Birtley | 343/5 EM X |
| 3,383,677 | 5/1968 | Baum et al. | 343/5 ST |
| 3,717,873 | 2/1973 | Riggs | 343/5 EM |
| 3,725,918 | 4/1973 | Fleischer et al. | 343/5 EM |
| 3,890,616 | 6/1975 | Kojima et al. | 343/5 EM |

*Primary Examiner*—T.H. Tubbesing
*Attorney, Agent, or Firm*—Howard P. Terry

[57] ABSTRACT

The invention is a radar harbor surveillance sensor, computer, and display system for providing a graphic display of vessels negotiating confined navigation channels and permitting rapid and accurate assessment of the degree of hazard or safety in the movements of the monitored vessels.

13 Claims, 10 Drawing Figures

MARINE TRAFFIC CONFLICT ASSESSMENT SYSTEM

BACKGROUND OF THE INVENTION

1. Field of the Invention

The invention pertains to electronic means for generating an early and easily assimilable warning of the build-up of an unacceptable traffic conflict in a harbor or estuary or in other confined waters viewed by a shore-based traffic surveillance system and more particularly relates to means for the computer generation of a graphic display adaptable for use with such surface search radar systems for the purpose, in the first instance, of determining the degree of conflict or of safety of monitored vessels with respect to established operational criteria. Secondly, the invention provides a quickly and accurately interpretable display for assessing the optimum effective procedures for elimination of the hazard condition and, furthermore, generates a permanent printed data record both in tabular and graphical formats.

2. Description of the Prior Art

Radio, radar, and other sensor systems have been employed in the past for communication and for surveillance and monitoring of marine traffic from a shore-based station or stations in the approaches and environs of ports, rivers, and harbors for improving safety of passage and orderly scheduling of movement of shipping. The technology is based upon exploitation of direct visual observation and radar sensing techniques and upon procedures developed for collision avoidance of mobile craft and vessels on the high seas and in waters connected therewith.

Typically, such harbor surveillance systems consist of one or more shore-based azimuth scanning radar systems, supported in the plural configuration by broadband data linking systems such as microwave relay links or co-axial cable where ever the radar data from a multiplicity of sensors is to be viewed at a single control or operational surveillance center. The marine traffic pattern is viewed at one or more shore-based radar plan position indicators by operators whose function is to interpret the traffic situation and to generate alerts when unacceptable ship movements occur or more importantly are about to occur, and to communicate with and to receive communications from ships within their spheres of coverage, such communications being concerned with the identification of specific ships in relation to their present positions and future maneuver intentions. In the special conditions where ships lack and are unable to acquire information necessary to their safe navigation, the operators provide such information in a form intelligible to and convenient to the shipmaster or pilot on board the cooperating vessel. A specific function of the shore-based radar surveillance system is to provide information which is available to the shore station by virtue of the selected location of its radar sensors and which may not therefore be available by examination of similar radar equipment on a specifically located ship because of restricted radar coverage in land-locked constricted canals, rivers, or narrow estuaries.

Recent concern with the promotion of improved safety of marine operations for the purposes of environmental protection and preservation has also added encouragement to governmental agencies of the leading nations to promote legislation governing the establishment and efficient operation of maritime traffic surveillance systems. Initially, such systems will monitor traffic and issue advisory communications to voluntarily participating vessels. It can be expected that vessel participation will become mandatory.

Even though shore-based surveillance systems may possess advantages over shipborne equipments devoted to acquiring navigational and traffic information by reason of their carefully-planned deployment and of the deliberate sophistication of equipment matched to high orders of reliability and availability and supported by application of the accurate and rapid data processing capability of the digital computer, certain impediments occur. The individual vessel negotiating an area of difficulty in terms of navigation or traffic density may exercise some discretion in applying its available resources to address those problems of most immediate concern and consequence. In contrast, the shore-based surveillance system must perform its functions with respect to its total surveillance region. When traffic densities are high, the work load generated is known to reach overwhelming levels. The combination of all of the threats posed by encounters of all the traffic elements taken a pair at the time can reach high numerical values.

More recent shipboard collision threat assessment techniques use automatic target trackers to acquire radar target data and a digital computer to process the radar target data and to provide easily-assimulated presentations of collision threat information to the shipmaster. Efforts to exploit these techniques at the shore-based location have revealed severe limitations. In shipboard systems designed to cope with the pattern of encounters which occur in the open sea, it has been discovered that a more limited applicability results in situations where ships are forced to abandon their normal operating pattern, which is to proceed in general on steady courses with steady speed and to follow the sometimes torturous channels of an estuary or harbor. In the latter situations, the likelihood of the ship continuing on at least a steady course is curtailed severely. Reliance upon the convention of prediction of future events based upon the extrapolation of the present positions, speeds, and courses of vessels becomes impossible. Instead, reliance is based on the convention that vessels will follow a predicted set of courses and speeds and normal radar displays are therefore used to monitor the situation to see that the ships do in fact follow the predicted courses. This allows prediction of the vessels' future positions even in the usual situation in which a number of bends or changes in channel configuration intervene.

SUMMARY OF THE INVENTION

The invention is a shore-based marine traffic conflict assessment system to be used in conjunction with and in further support of the normal radar and synthetic data plan position indicator presentations generated by a surface search radar and the computer-aided track-while-scan apparatus of a shore-based marine traffic surveillance system. The novel system permits the observer to make an assessment based, in the first instance, on a nominated and negotiated distance-time profile for each vessel forecast to be in the surveillance area of a maritime traffic region and, subsequently, upon measured position and speed data as detected in real time by the radar sensor and tracking system. Further, the assessment is based on knowledge of the present position of all tracked vessels and the time and geographical positions of the meetings and overtakings of all tracked vessels. The system relates these encounters to certain designated areas in which either a multitude of meetings or even any meeting, head on, crossing or overtaking is to be discouraged or possibly prohibited. The coordinate and coordinate rates and identification codes obtained from the track-while-scan unit of the radar system are used to generate a synthetic cathode ray tube display of novel format for traffic conflict assessment. The display permits identification and selection of the optimum and most effective corrective action which is then passed by suitable communication means as a recommendation or as an instruction to the identified vessel. The novel graphical format of position-time profiles permits accurate and rapid judgment by the observer of optimum maneuvers by which the vessel may avoid the conflict situation.

The conflict assessment indicator indicates in a graphical format the present position of all tracked targets moving in the confined waters under surveillance and their predicted progress through the channel system as a function of future time. The presentation is such that all meetings, crossings, and overtakings are immediately displayed to the operator. The analog or graphical recorder records the past history of all tracked vessels transiting the system in the same format as used in the conflict assessment indicator and a digital printer may be used to record the past history in tabular form.

DESCRIPTION OF THE PREFERRED EMBODIMENTS

Figure 1:
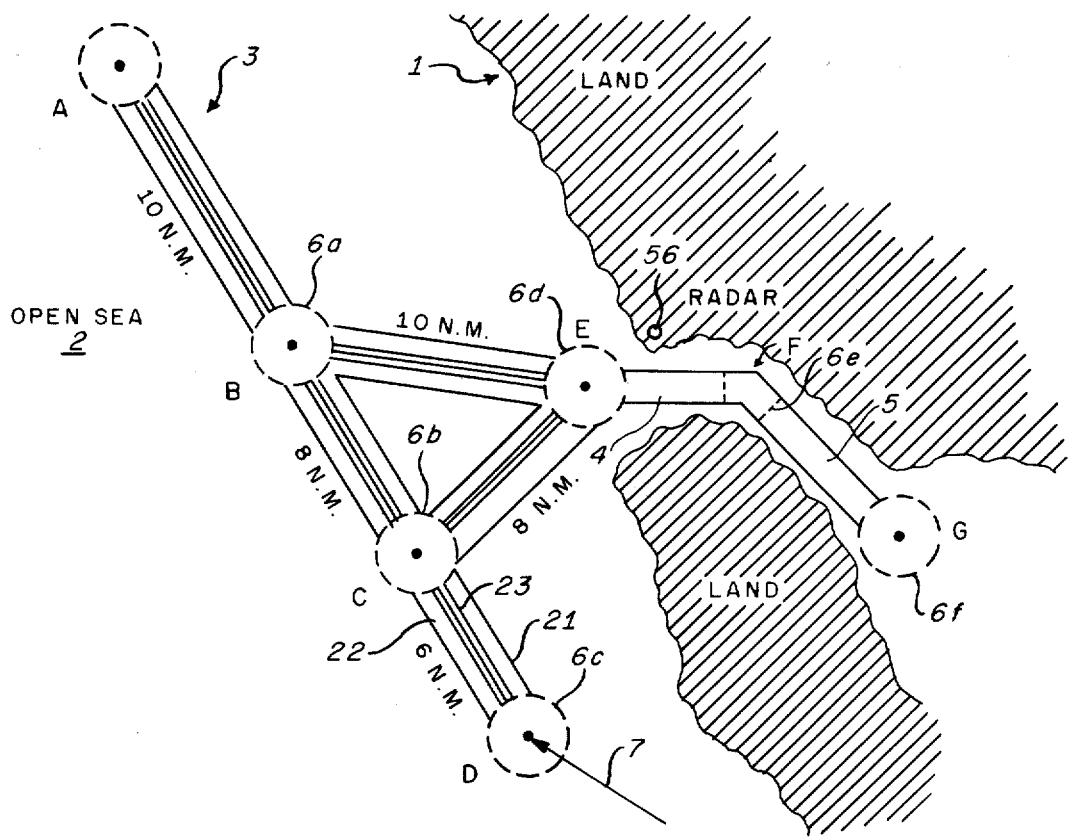
FIG. 1 is a simplified picture of a harbor entrance and its approaches which illustrates the confined nature of the waters to which use of this invention applies.

The problems solved by the invention involve marine navigation with respect to harbors and other confined channels of the general type illustrated in the representative harbor chart of FIG. 1. In FIG. 1, there is schematically illustrated a shore line 1, outlining the land to the right of the open sea 2 and showing a typical harbor-entrance separation lane system 3 reaching along way points A to B to C to D, with connections to way point E from B and C, a narrow estuary characterized by the reach 4 from way point E to F, and the reach 5 from way point F to G. The dotted circles such as circle 6a and the section of the channel at 6e at the respective locations B through G enclose areas which are hazardous in various degrees and wherein special precautionary measures must be exercised by the ship master. In operation, the novel display is employed to predict when craft will meet when moving within the established navigation channels, such as those associated with reaches 4 and 5 or the separation lane system 3. The vessels traversing the estuary are assumed to stay in the prescribed channel or other prescribed area such as 21 and 22 which are separated by separation lane 23, while transiting the harbor system. As a result, the bearing of the lane or reach, or the course the vessel is actually steering, are not directly relevent and only the vessel's progress through the system as a function of time is important in solving the conflict problem.

As reported by the representatively located surveillance radar 56, a selected incoming vessel may be approaching along a vector 7, assumed to be a straight line, at a speed $\dot{r}$ knots; from this data, its time of arrival at way point D and thence at C and E can be determined. The computer associated with surveillance radar 56 and calculating the approach time for vessels being tracked will monitor any actual changes in course and speed of the selected vessel, as will be explained in connection with FIGS. 3 through 8. Having arrived at way point E, the vessel will transit the reach 4 between way points E and F at a speed designated $\dot{r}_{(E-F)}$ and the reach 5 between way points F and G at a speed signified by $\dot{r}_{(F-G)}$. It may then leave the monitored portion of the estuary at way point G.

Figure 2:
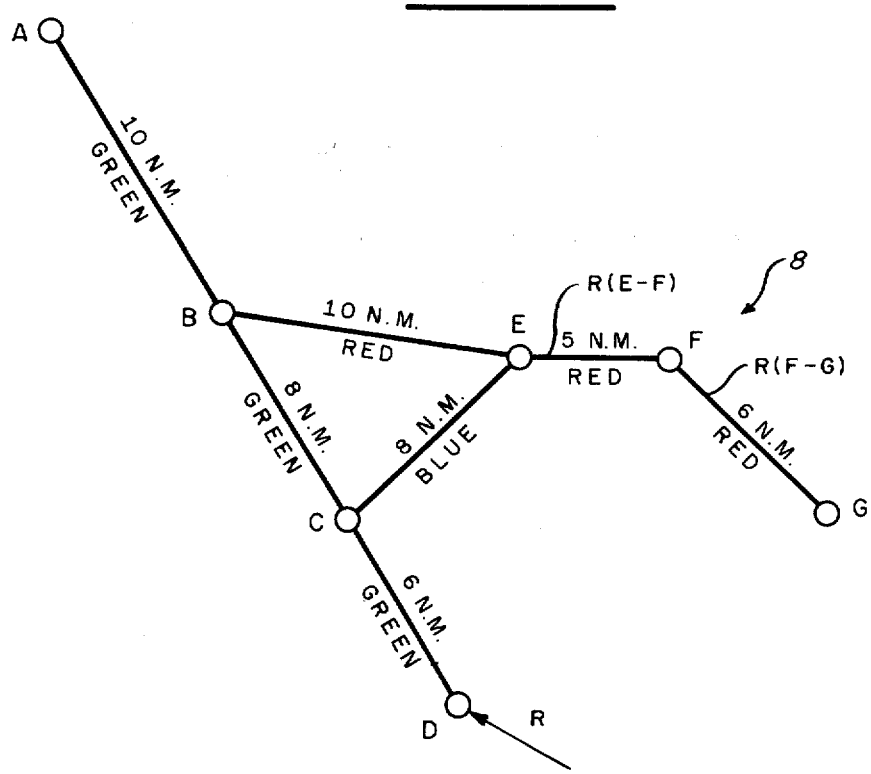
FIG. 2 illustrates the general schematic form in which the true geographical shape of the harbor and its approaches are presented to the operator according to the present invention.

As a result of being bearing invariant, the estuary can be shown schematically by a representation of straight line segments, as shown in FIG. 2. The distances such as R, $R_{(E-F)}$, and $R_{(F-G)}$ are shown in capital letters to signify that they are preferably in scale miles. Likewise, $\dot{R}$ and T signify scale speed and time, respectively.

Figure 3:
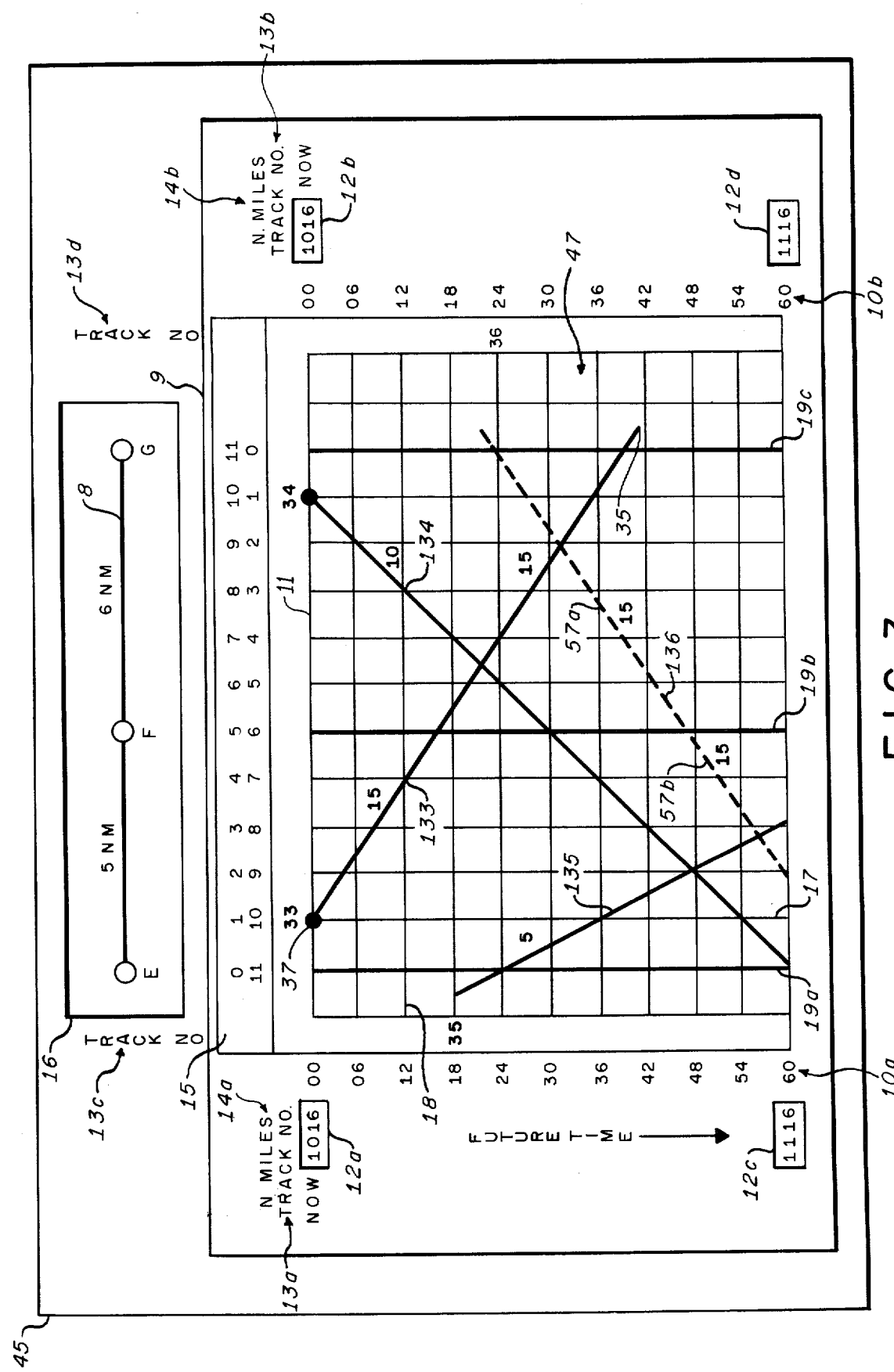
FIG. 3 is a plan view of the actual display showing four vessel tracks and which is used to explain the nature of the display.
Figure 8:
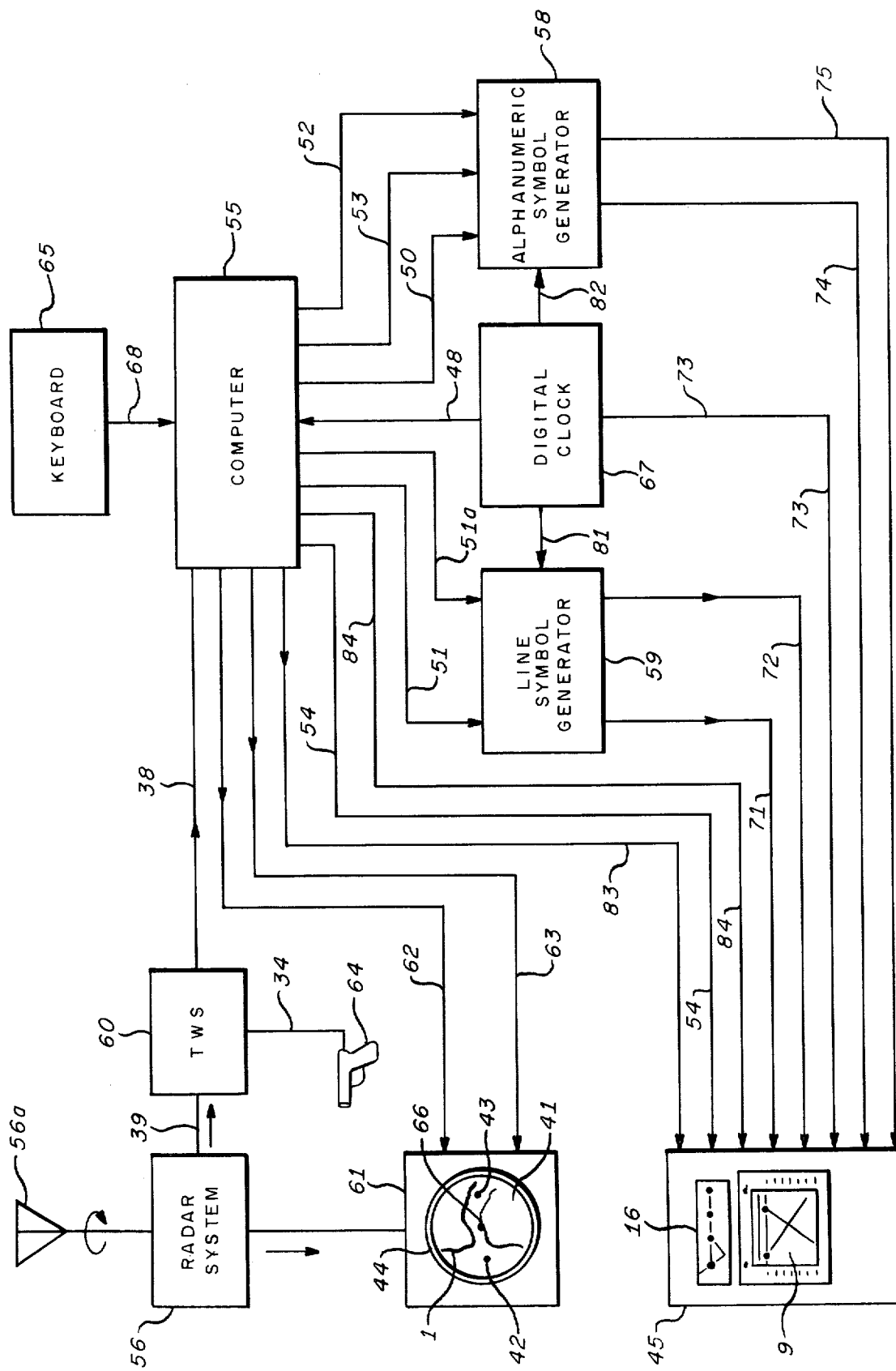
FIG. 8 is a block diagram of the novel system showing its components and interconnections.

As the purpose of the novel conflict assessment display is to predict future events, it is necessary for the shore surveillance system operator to determine the intended action of the selected incoming vessel by voice communication or by automatic means such as a secondary radar system. Having thus determined the reaches and proposed speeds to be used by the selected vessel, the surveillance system operator can enter these data into the computer 55 using a conventional keyboard instrument 65, as shown in FIG. 8. The computer 55 will then organize the data for presentation on the conflict assessment display 45 of FIG. 8. As shown in FIG. 3, the face of display 45 has mounted on it an interchangeable card 16 with a copy of the estuary schematic such as is representative, for example, of the portion E through G of the path indicated in FIG. 2 at 8. Located below representation 8 in FIG. 3 is the novel cathode ray display 9 of the conflict assessment indicator 45. That part 9 of the indicator 45 is devoted to furnishing the distance-time diagram of the present invention. The information on card 16 may alternatively be supplied by computer 55 to the cathode ray screen of display 45.

Along each side of the presentation 9 are located the numerical indices of the similar future time scales 10a and 10b in vertical formation. In the example of FIG. 3, there is shown a one hour time period in ten steps of six scale minutes each. Centered in height along the extensions of the NOW time line 11 at the top of the grid 47 are shown two read outs 12a and 12b of the digital master clock 67 of FIG. 8. A 24 hour time scale is preferably used. In the example, the time shown is 1016 hours. The time read outs 12a and 12b are labeled NOW so as to remind the operator continuously that they show present time. At the bottom ends of the time scales 10a and 10b there are two additional time read outs 12c and 12d. They show the time 1 hour in the future and in the example they show 1116 hours.

Above each of the NOW time read outs 12a and 12b are found at 13a and 13b the abbreviations TRACK NO., standing for track number. These abbreviations signify that the numbers placed by the computer 55 just above the NOW line 11 identify the start of the separate tracks made by vessels in the display. Likewise, above the vertical vacant spaces on each side of grid 47 will be found the legend TRACK NO. at 13c and 13d, signifying that the computer generated numbers also identify the remaining vessel tracks. In FIG. 3, four tracks identified by track numbers 33, 34, 35, and 36 are shown. The refresh or frame rate for these tracks and all alphanumeric characters and other line segments placed on the display by computer 55 is above the flicker rate and 30 frames per second may be assumed as representative. Just above the legends TRACK NO. at 13a and 13b on each side of the display grid 47 are found the words N. MILES at 14a and 14b standing for nautical miles, for example. These legends signify that the horizontal rows of numbers in the horizontal scales 15 are in scale nautical miles, for example. Below the horizontal scales 15 is the display grid 47. The computer 55 may form the grid 47 by causing a vertical line segment such as line 17 to be drawn in a generally conventional manner below each of the miles or distance marks numbered in scale 15. It will similarly complete the grid 47 by causing a horizontal line segment such as line 18 to be drawn between each pair of numbers in the future time scales 10a and 10b.

The computer 55 then completes the preparatory picture by adding, as punched in by the operator on keyboard 65, vertical lines 19a, 19b, and 19c, for example, below the N. MILES index numbers zero, five, and eleven, which numbers correspond to the way points E, F, and G on the typical estuary schematic. The preparatory activities for setting up the display, which may be, of course, almost instantly completed when the terminal is turned on or switched to a different scene, have been described. The track prediction phase will now be explained.

As to the track prediction phase, the dotted or otherwise coded track line 136 of FIG. 3 will be described first. The fact that the track line 136 is dotted or otherwise distinguished conveys to the harbor control system operator that a certain vessel which has not yet been acquired by the surveillance radar system 56 intends to enter the system at way point G, for example, at 1040 hours, and intends to transit the estuary from way point G to F to E to the open sea at 15 knots. Having entered this data, pressing the ENTER KEY of the keyboard 65 will cause the computer 55 to draw the dotted track line portraying the data, as shown at 136. It will enter the vessel's speed (in this case 15 knots) once in each different reach to the right of the track line. As the track line 136 is redrawn during each display scan frame, the computer 55 will cause it to move up, parallel to itself so that it will always start at 1040 hours. In the example illustrated in FIG. 3, the speed symbol fifteen is seen printed just below the dotted track line 136 at points 57a and 57b.

When the entering vessel is picked up and put into track by the surveillance radar 56, the dots or other distinguishing elements of line 136 merge into a solid line, indicating that the entering vessel has been acquired by the radar and is being tracked. The track-while-scan subsystem 60 will continuously provide the vessel's current position and measured speed to computer 55 and the computer will use these measured values for all subsequent predictions, distinguishing between actual and predicted motions. As the radar 56 will pick up the ship of track number 36 before the ship reaches way point G when the target is in track, track line 136 may begin to the right of the way point G, as is illustrated by track 35 and track line 135.

In FIG. 3, the track number thirty five represented by solid line 135 is a representation of a vessel approaching the estuary from the open sea which has been acquired by the radar 56 and is being tracked by the system. It was picked up by the radar 56 at time 1034 and will enter the displayed portion of the estuary at way point E at 1040 hours and will proceed up the estuary at five knots. Track number thirty three represented by track line 133 designates a vessel that is being tracked by the system and which is now at time 1016 one mile from way point E towards way point F. It entered the system at way point E some 4 minutes earlier at 1012 hours. The computer 55 has been informed by operation of keyboard 65 that it will transit the estuary from way points E to F at 15 knots. The speed has been confirmed by track-while-scan subsystem 60. Track line 134 represents a vessel having track number 34 that entered the estuary some eight minutes earlier at time 1008 hours and which will transit the estuary from G to F to E toward the open sea at 10 knots. This target is being tracked and the track-while-scan subsystem has confirmed its speed. Inspection of FIG. 3 will show that all four of the cross overs of track lines 133, 134, 135, 136 are desirably remote from the vertical reference lines 19a, 19b, and 19c, and are therefore remote from the hazardous area of way points E, F, and G described already with respect to FIG. 1. Cross overs in any event represent meetings of cooperating vessels and, as noted in the foregoing, are to be avoided in hazardous areas. In other words, the display 9 is used properly when all cross overs avoid proximity to the vertical lines 19a, 19b, 19c.

Inspection will show that certain equations may be used to draw the track lines 133, 134, 135, 136 by electronic means 59. For example, the scale distance made good by a vessel passing from way point E toward way point F is $R_{(E-F)}$ and, noting that the origin of coordinates is in the upper left corner of grid 47, the equations describing the future track are:

$$R_{(E-F)} - R_{(E-F)_0} = \frac{Kts}{60}(T-T_0) \qquad (1)$$

where $T_0 \leq 0$, and where:

$$\dot{R}_{(E-F)} = \frac{Kts}{60} \qquad (2)$$

is the target speed between way points E and F in nautical miles per minute. Also, $R_{(E-F)}$ is the target position in scale miles which has the dimensions nautical miles per inch, $R_{(E-F)_0}$ is target position on the NOW or time $T_0$ line, T is scale time having the dimension minutes per inch, and $T_0$ is the scale time that the target left way station E. Substitution of equation (2) in equation (1) yields:

$$R_{(E-F)} = -\dot{R}_{(E-F)} [T - T_o] + R_{(E-F)_0} \quad (3)$$

The $T_o$ offset for track line 135 would be $-18$ minutes. The offset $R_{(E-F)_0}$ for track line 133 is 1 mile and 10 miles for track line 134. The value of $R_{(F-G)}$ is $+5$ miles. For a target moving in the opposite direction as from way point F to E such as may be represented by track line 134, the equation would be:

$$R_{(F-E)} = \dot{R}_{(F-E)} [T - T_o] - R_{(F-E)_0} \quad (4)$$

These equations take care of the predictions in scale miles and scale time; however, it should be understood that physically they represent the action of drawing straight line segments in Cartesian coordinates whose $x$ axis is labeled R in scale miles and whose $y$ axis is labeled $-T$ with a scale time in minutes. To be useful, the above equations must be related to the real world in real time. This is done, in the example, by adjusting the value of the R axis offset $R_{(E-F)_0}$ as a function of real time.

Consider, for an example, track line 136 in FIG. 3. In this case, the computer 55 is told by the surveillance system operator to start a track at the point (11.5, 1030), where R = 11.5 locates the entrance side of the precautionary area surrounding way point G, with a slope of $$\dot{R} = \frac{15}{60}.$$

Using these data, the computer 55 will calculate the point (R, $-1116$), which is where the track line will cross the lower edge of grid 47. It will then instruct the line symbol generator 59 of FIG. 8 to draw a dotted line from the point (11.5, $-1030$) to the point (R, $-1116$). The computer must then calculate how far to move the track line 136, in this case to the left, at the next refresh time or some selected number $n$ of refresh times later. To do this, computer 55 makes use of equation (5):

$$R_o = \pm \frac{\dot{R}}{N} \frac{(n-n_o)}{F_R} \quad \begin{vmatrix} n - n_o = \text{max.} \\ n - n_o = 0 \end{vmatrix} \quad (5)$$

The factor $F_R$ is the line refresh rate in scans per minute. If the track line 136 is to be moved or refreshed every frame, $F_R$ would equal the frame rate of the display in frames per minute. In equation 5, $N$ is the scale factor in inches, and ($n - n_o$) is the difference between the present frame count $n$ and the count $n_o$ when the vessel represented by track line 136 entered the system.

The sign of $R_o$ is positive when that vessel is to move to the right and negative when it is to move to the left. Also:

$$(n-n_o)_{max} = \frac{NF_R}{\dot{R}} W \quad (6)$$

and is a numeric where $W$ is the width of the picture in scale nautical miles. To continue the example of track line 136 in FIG. 3, the computer 55 first determines if there is a value other than zero for $T_o$. If there is (in this example $-24$ minutes), the computer would reduce $T_o$ by the track line refresh period $T_R$ from $T_o$ to get a new $T_o$. Here:

$$T_R = \frac{1}{F_R} \text{ minutes.} \quad (7)$$

The real-time clock 67 would also have advanced the same amount during this period. The computer 55 would next compute the points $(11.5, -(T - T_R))$ and $(R, -(T + T_R))$ and, at the next track line refresh time, it would instruct the line symbol generator 59 to redraw line 136 between these points. The result is to move the line 136 up the display face while extending it, in this example, from $(11.5, -T_o)$ to $(R, 1116 + T_R)$ where $(R, 1116 + T_R)$ is the point at which track line 136 exits through the lower edge of the grid 47. The computer 55 initially examines the value of R to see if, in this case of a vessel moving to the left, R has become equal to R $_{(EXIT)}$, the exit value for the way point at which the vessel is leaving the displayed portion of the estuary. In the example of track line 136, this is $-0.5$ miles. When the value of R reaches $-0.5$, the computer 55 will store the time and calculate DT $= t + 60 - T_o$, where $t$ is the present real time.

At subsequent track line refresh period, computer 55 calculates the left point at $(R, (-t + T_R))$, where $t$ is the present real time. The result would be for the line, (which in the example of track line 136 now extends from R $= -0.5$ to R $= 11.5$ or across the display), to move up on the display. When the computer 55 checks each time to see if R has reached $-0.5$, for example, or whatever value represents the exit limit at the way point concerned, it must also check for whether or not $I_o$ has reached zero. If $T_o$ has reached zero, computer 55 will calculate for each subsequent line refresh time the point $(R_o, 0)$ using equation (5) and, using equations (3) or (4), as appropriate, it will calculate the other end of the track line using $(R, -(t + 60))$ if the line exits through the lower edge of the grid or $(R, -(t + T_R))$ if the line exits through either vertical side of grid 47. The result is to move the track line 136 to the left or right depending on which way the vessel is moving. This is to the left in the example of track line 136. Such operation is continued until $R_o$ equals the position of the appropriate edge of the way point at which the target is leaving the displayed portion of the estuary. With this event, the tracked vessel is dropped from the display 9.

Some time during the above process, the target vessel represented by track number 36 in the example may come into radar range. If the overall system employs manual target acquisition in the track-while-scan system 60, the operator would by operating keyboard 65 assign the track number in use, 36 in the example, to the target to be acquired by the track-while-scan system 60. In the case of automatic target acquisition, the computer 55, on receipt of a target acquired signal from the track-while-scan system 60, first searches its vessel position memory to see if, within the prescribed tolerances, it has an expected target at that point. If it finds such a coincidence, it assigns the existing track number to the newly acquired real track. If it does not find a coincidence, it assigns a new track number to the vessel. The final complete equation for a reach or for a number of reaches traversed at the same speed is:

$$R = \pm \dot{R}(T-T_0) \mp \frac{\dot{R}}{N} \frac{n-n_0}{T_R} \left| \begin{array}{l} n-n_0 = \frac{NF_R}{\dot{R}}W \\ n-n_0 = 0 \end{array} \right. \quad (8)$$

where:

| In General | | In Figure 3 |
|---|---|---|
| $R =$ | scale miles made good from one way point to another (units n. mi./in.) | various |
| $\dot{R} =$ | Kts/60 n.m./min. | various |
| Kts = | Knots = n. mi./hr. | various |
| $N =$ | scale factor in inches | 1 |
| 60 = | time factor, min./hour | 60 |
| $T =$ | $T_0 =$ scale time in units of minutes/inch | 6 min./in. |
| $(n-n_0)$ | is present frame count less the frame count when the target entered the system and is a numeric | N/A |
| $T_R =$ | the frame count in minutes (must be a multiple of the display refresh rate) | N/A |
| $F_R =$ | the track line refresh rate and would be 1800 per minute if the multiple is one and the display refresh rate is 30 times per second | N/A |
| $W =$ | the width of the display in scale miles | 12 |

As a track line is advanced across the display in real time, the intersection of the track line with the NOW time line 11 is the target's present position in the estuary. This is emphasized in FIG. 3 by the large dots at track numbers 33 and 34 where track lines 133 and 134 intersect NOW line 11. From this it will be seen that the vessel with track number 33 is 1 mile into the estuary from way point E and has 10 miles to go to reach way point G.

Two methods are available to set up the initial conditions in the plot of each vessel. One has been pointed out above in connection with target 36 as represented by dotted track line 136. Until the target is acquired by the radar 56, the time offset is simply as announced. When the target is acquired, prior to entering the channel at way point G, the computer 55 computes the time of arrival from the measured and stored range and range rate data and uses that as the offset. Any important difference between the announced and the measured speed will be communicated to the ship's master. A side benefit of the procedure is a calibration of the ship's log each time a vessel enters the system.

In the second case wherein the ship is entering from the open sea, the operation is the same as in the latter part of the above case. In this second case, the announcement and the automatic acquisition by the radar 56 are essentially simultaneous, so the measured data is used to calculate the time of arrival offset. The principal use of the radioed announcement of the ship's intentions is to inform the surveillance system operator of the ship's intended route and destination for insertion by keyboard 65 into the computer 55. Such a procedure is required in a multi-route system. If there are special speed requirements or other regulations in different reaches in the system, they will be accounted for in the prediction of future target position. When the ship arrives at those reaches, the predictions based on the measured data will confirm that the vessel is conforming to any such requirements.

Figure 4:
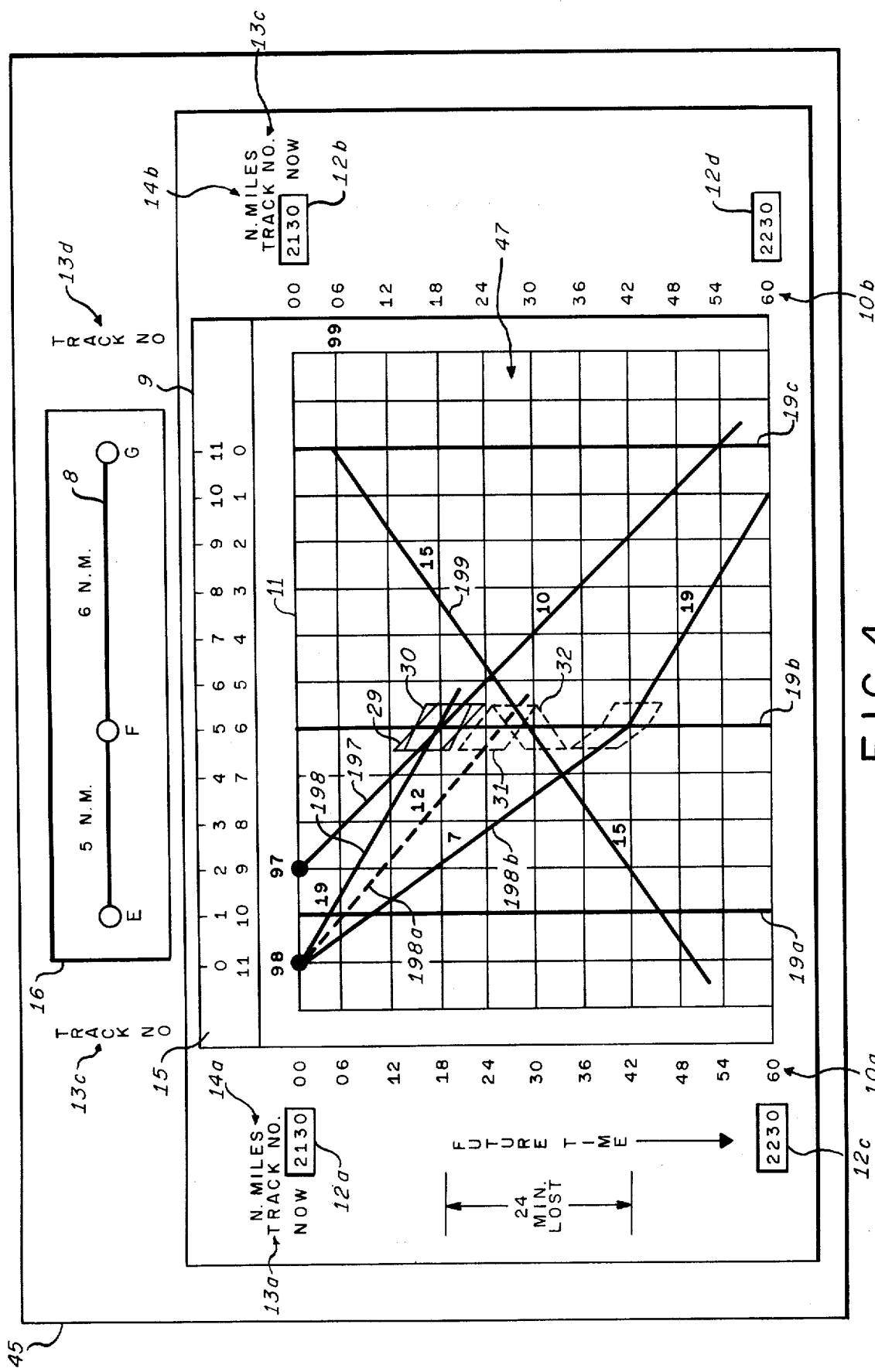
FIG. 4 is a plan view of the actual display that shows three tracks, two of which are in conflict.

With the foregoing in mind, the case of two ships in a conflict situation will now be considered in connection with FIG. 4. Here, a ship designated by track number 97 entered the estuary at way point E 12 minutes earlier than time NOW and is proceeding to way point G at 10 knots. A ship designated by track number 99 is expected to enter way point G at 2136 hours, some 6 minutes from time NOW and will transit the estuary toward way point E at 15 knots. Those ships will pass in a convenient place about a mile and a quarter from way point F toward way point G at 2159 hours. At the present time (2130 hours), the ship having track number 98 appears at way point E traveling at 19 knots speed toward way point F.

These events are shown by track line 198. Following the ship's track line 198 into the future, it can be seen that it intersects the second ship's track line 197 at 2148 hours at way point F which event, because way point F is a blind bend, should be avoided. The sizes of the precautionary areas are usually defined by circles of fixed radius for areas in which vessels have room to maneuver or as a fixed distance on each side of a way point as shown for way point F in FIG. 1.

In a computer assisted system such as the present invention, it is possible to abandon the customary fixed size precautionary areas and to have the computer compute a particular separation distance for each vessel entering a precautionary area in proportion to estimated stopping distance. This value may be computed with sufficient accuracy for the purpose intended by a formula relating each vessel's size and speed. A similar computation can be made for minimum clearance time. A vessel should not enter a precautionary area until some specified clearance time after another has cleared the area unless, as is shown in FIG. 1, there are separation lanes. With separation lanes, only ships crossing the extension of the separation lane need observe clearance times.

In the case of the examples illustrated in FIG. 4, a separation distance of $\pm 0.5$ miles and a time of $\pm 3$ minutes is assumed typical. As a result, when and only when two ships are in conflict, as are in the ships of FIG. 4 having track numbers ninety eight and ninety seven, the computer 55 provides a boundary defining an area or region which may be quadrilateral or may take other shapes, the boundary appearing at the representation of the way point (or points) in which a conflict situation is predicted. Preferably, the displayed boundary is a safety region in the form of a parallelogram with two of its sides parallel to the ship's track and two sides vertical with respect to grid 47. Knowing the scale time-axis and distance-along-track dimensions, the computer continuously computes all of the parallelogram regions for each displayed precautionary area and checks them for overlap. It will not instruct the line generator 59 to draw them until it has found an overlap which, of course, indicates a violation of the established rule by a ship's master. When the computer 55 has found one or more overlaps among the displayed precautionary areas at a given way point, it instructs the line segment generator 59 to display all of those precautionary parallelogram areas that are in overlapped relation and causes an alarm to be operated. In this way, any impending conflicts are brought forcibly to the surveillance operator's attention.

A representative way in which the precautionary parallelogram areas may be displayed will now be described in connection with FIG. 4a, where it is seen that each such parallelogram has a length $L_F$ along the forward direction of the vessesl's motion and a length $L_A$ in the reverse or aft direction. The displayed precautionary area will have a width of $2T_W$. The values $L_F$, $L_A$, and $T_W$ are either fixed constant values for the harbor under consideration or will have been agreed to between the ship's master and the harbor surveillance operator according to the vessel's size and maneuverability.

Figure 4A:
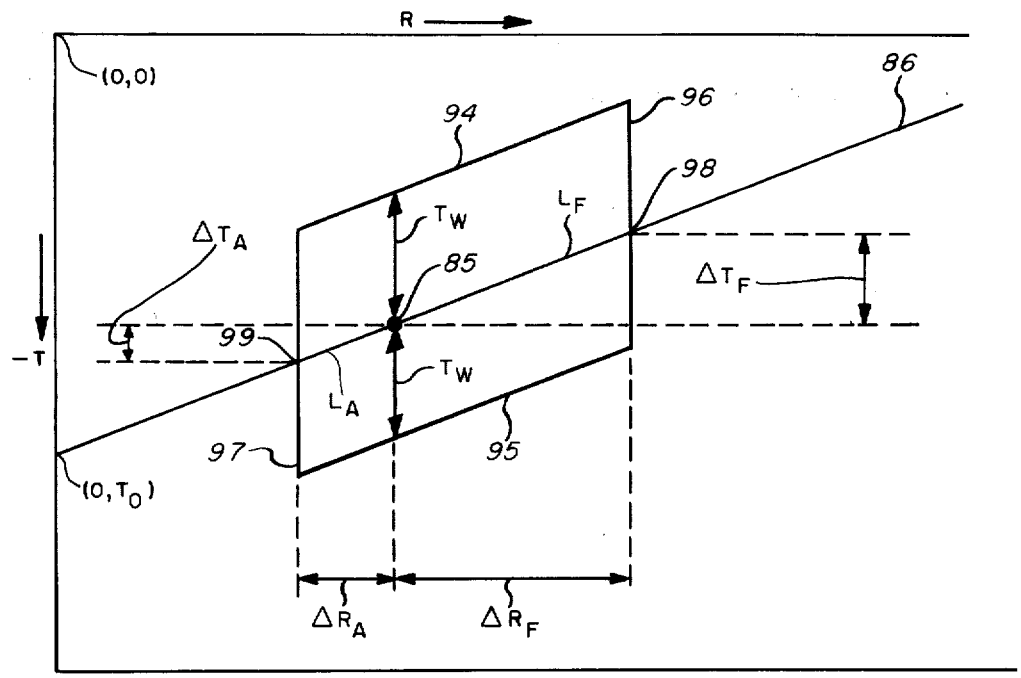
FIGS. 4a and 4b are diagrams useful in explaining the operation of the invention.

In FIG. 4a, a vessel is located at point 85 on line 86, its present location being defined by:

$$R = \dot{R}(T-T_0) - R_0 \tag{9}$$

Equation (9) is a general expression, so that in the present case, one may arbitrarily let $R_0$ be equal to zero, thus making $T_0$ the point where the line 86 crosses the T axis, and $R_0$ may be dropped from further consideration. The upper boundary line 94 of the precautionary area to be displayed is defined by:

$$R = \dot{R}(T-(T_0 + T_W)) \tag{10}$$

and the lower boundary line 95 by:

$$R = \dot{R}(T-(T_0 - T_W)) \tag{11}$$

Both of the lines 94 and 95 extend from $R - \Delta R_A$ to $R + \Delta R_F$, where:

$$L_A{}^2 = \Delta R_A{}^2 + \Delta T_A{}^2 \tag{12}$$

$$L_F{}^2 = \Delta R_F{}^2 + \Delta T_F{}^2 \tag{13}$$

as $\dot{R}$ is the slope of a target ship track line:

$$\dot{R} = \Delta R_A / \Delta T_A = \Delta R_F / \Delta T_F \tag{14}$$

Rewriting equation (14):

$$\Delta T_A = \Delta R_A / \dot{R}$$

Substituting this value of $\Delta T_A$ in equation (12):

$$L_A{}^2 = \Delta R_A{}^2 + \Delta R_A{}^2 / \dot{R}^2$$

Finally, solving for $\Delta R_A$ yields:

$$\Delta R_A = (\dot{R}^2 / (1 + \dot{R}^2))^{1/2} L_A$$

Likewise, $\Delta R_F$ may be similarly derived:

$$\Delta R_F = (\dot{R}^2 / (1 + \dot{R}^2))^{1/2} L_F$$

These values of $\Delta R_A$ and $\Delta R_F$ will be used for purposes yet to be explained.

It will readily be seen that the computer 55 may store this data and use it upon internal or other command to draw the parallel lines 94 and 95.

The vertical end lines 96 and 97 for the displayed parallelogram precautionary areas pass through the respective points $(R + \Delta R_F, T_F)$ and $(R - \Delta R_A, T_A)$ on a ship's track line.

The end line 96 extends from $T_F - T_W$ to $T_F + T_W$. The point 98 on line 96 is defined by:

$$T_F = \frac{R - (R_0 + \Delta R_F)}{\dot{R}} + T_0 \tag{17}$$

The end line 97 extends from $T_A - T_W$ to $T_A + T_W$, where the point 99 is defined by:

$$T_A = \frac{R - (R_0 - \Delta R_A)}{\dot{R}} + T_0 \tag{18}$$

The computer 55 is readily programed to use equations (17) and (18) to instruct the line symbol generator 59 to draw the vertical end lines 96 and 97 of the displayed precautionary area, thus completing its boundaries when the step is commanded.

Should there be a change in $\dot{R}$ during the interval bounded by $R - \Delta R_A$ and $R + \Delta R_F$, the calculations are made with the original value of $\dot{R}$ up to the value of R at which $\dot{R}$ changes, and are then made with the new value of $\dot{R}$.

Figure 4B:
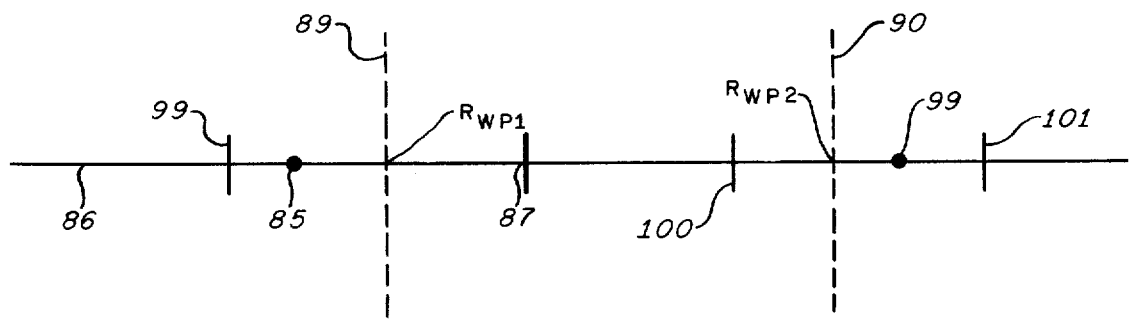

Any conflict situation is observed by computer 55 employing the data generated and stored from equations (9) through (18). For example, consideration may be given to a vessel proceeding toward the right at point 85 on the line 86 as illustrated in FIG. 4b. The present position of the vessel is:

$$R_{85} = \dot{R}_{85}(T_{85} - T_{85_0}) + R_{85_0} \tag{19}$$

The forward extension 87 of the vessel's precautionary area is located at:

$$R_{F85} = \dot{R}_{85}(T_{85} - T_{85_0}) + R_{85_0} + \Delta R_{F85} \tag{20}$$

Each time that display 9 is brought up to date, computer 55 interrogates its memory to determine if the value of $R_{F85}$ lies between any pair of way points whose safety or precautionary zones would have sides nearer to the vessel when displayed with values of R equal to or greater than $R_{F85}$.

Consider a way point with a corresponding precautionary area defined in part by line 89 having $R = R_{WP1}$ in FIG. 4b and by line 90 having $R = R_{WP2}$; here, computer 55 determines if:

$$R_{WP1} \leq R_{85} \leq R_{WP2} \tag{21}$$

If computer 55 finds that $R_{WP1}$ is equal or larger, computer 55 stores that observation, continuing to search its memory for similar intrusions by other vessels of the same way point. Such an intrusion is typified by that of a vessel at point 99 whose future extension 100 falls at $R_{100}$. When such a condition prevails, the computer 55 activates any suitable alarm and causes the display of the two appropriate parallelogram precautionary areas. The computer 55 also continuously searches its memory for all way points ahead to determine if the aft end of the first vessel's precautionary area, say $R_{A85}$ at point 99, falls within the precautionary area defined by $R_{WP1}$ and $R_{WP2}$. As the precautionary area when displayed is always wider than the longest displayed precautionary area, the case of overtaking of two ships is accounted for. Because computer 55 checks for all vessels and all way points at each refresh time, all conflicts are promptly located and indicated in the foregoing manner.

Returning to the example of the vessels with track numbers 98 and also 97 in FIG. 4, it is forcast by computer 55 that the ship with track number 98 will engage in the forbidden passage of the ship with track number ninety nine at the bend of way point F. Accordingly, computer 55 generates the solid line parallelogram precautionary areas 29 and 30 along the vertical line 19b corresponding to way point F. A first thought of the harbor surveillance operator might be to slow the ship with track number 98 so that it enters the precautionary area at way point F 6 minutes behind the ship represented by track number 97. By operating keyboard 65, the operator inserts these data into the computer which then causes display of the new or trial track and computes the required speed. When the operator does this, a new dotted track 198a with a 12 knot speed symbol appears. Although the track line 198a clears the track line 197 acceptably, examination of its future extension past way point F shows that the vessel corresponding to track number ninety eight will now meet that corresponding to track number 99 (track line 199) just as it is entering the display of precautionary area of way point F, so that the operator would have made the situation worse instead of better. The computer 55 will of course have put up the dotted parallelogram precautionary areas shown at 31 and 32 for display and would have actuated an alarm.

As a second trail, the surveillance system operator might request a trial track that would require the track number 98 vessel to enter the precautionary area at way point F 6 minutes after the track number 99 vessel has cleared it. The computer 55 would then cause track line 198b to be put up with a required speed of 7 knots indicated. The display shows the vessels passing in the straight section about a mile toward way point E from F. As soon as the vessel of track number 98 is well clear of that with track number 99, the track number 98 vessel can return to its original 19 knot speed. In FIG. 4, this is shown as occurring at way point F. As track line 199 and track line 198b are now clear of intersections at vertical line 19b, the parallelogram precautionary areas 31, 32 for way point F are no longer displayed. Considering the time that the track number 98 vessel would have cleared way point F if its passage had not been interrupted, some 24 minutes have been lost.

Figure 5:
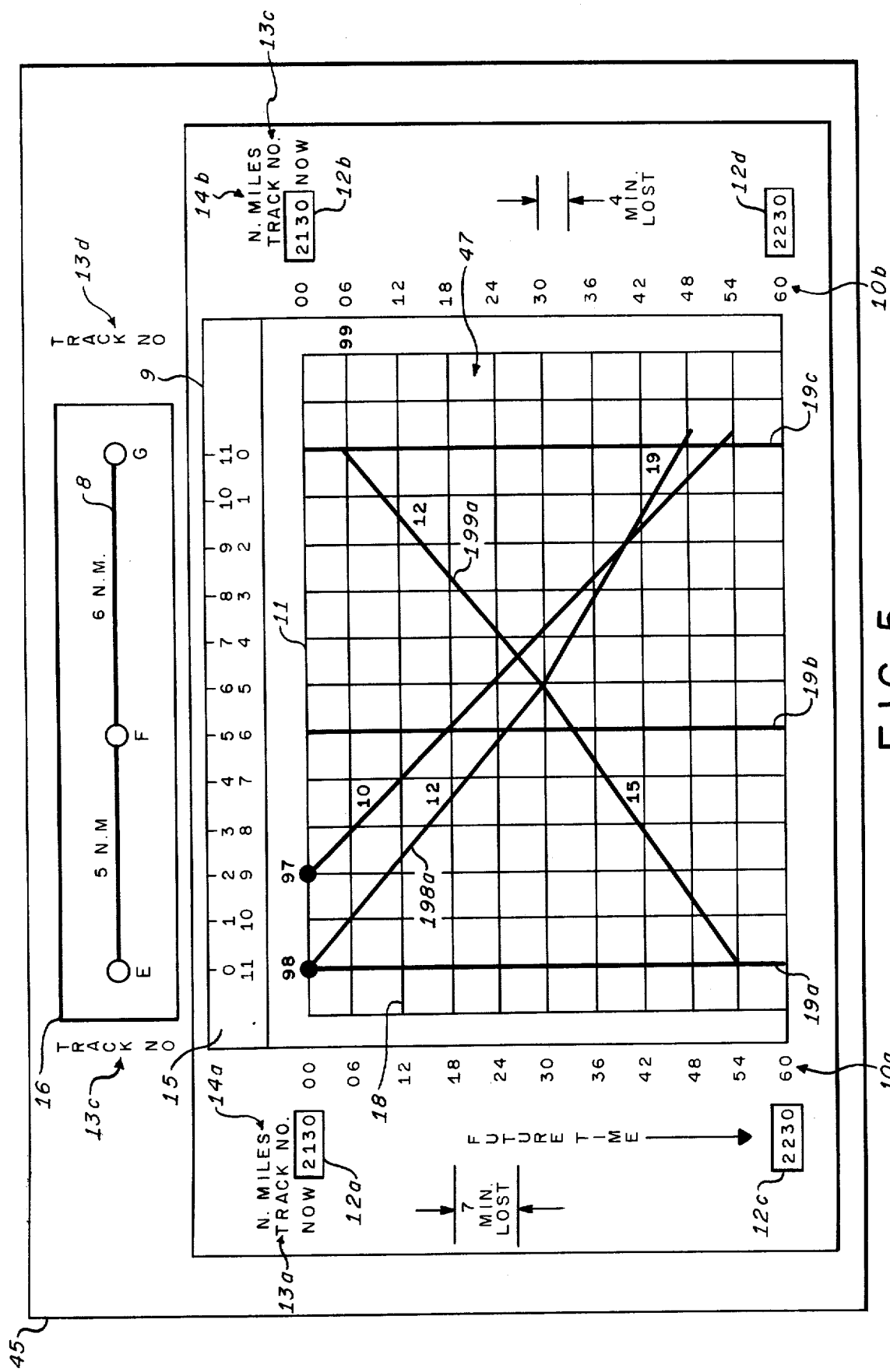
FIGS. 5 through 7 are generally similar to FIG. 4, each showing how different navigation problems are resolved.

A preferred way to resolve the conflict between the two vessels which loses less time is illustrated in FIG. 5. The track number 98 speed would be reduced to 12 knots as in the first trial of FIG. 4. The surveillance operator would ask for a trial speed to slow the track number 99 vessel to a speed such that it would meet the track number ninety eight vessel for instance, a mile from way point F toward way point G. This new track line 199a also shows that a speed of 12 knots is to be used. After the vessels pass, both return to their normal speeds, as shown on display 9. Even though the track number 98 vessel has held a lowered speed, it has lost only 7 minutes. The track number 99 vessel has lost only 4 minutes. Neither losses are of consequence in view of the desirability of achieving a safe passage. The track number 98 and 97 vessels now overtake safely well within the reach F-G.

Figure 6:
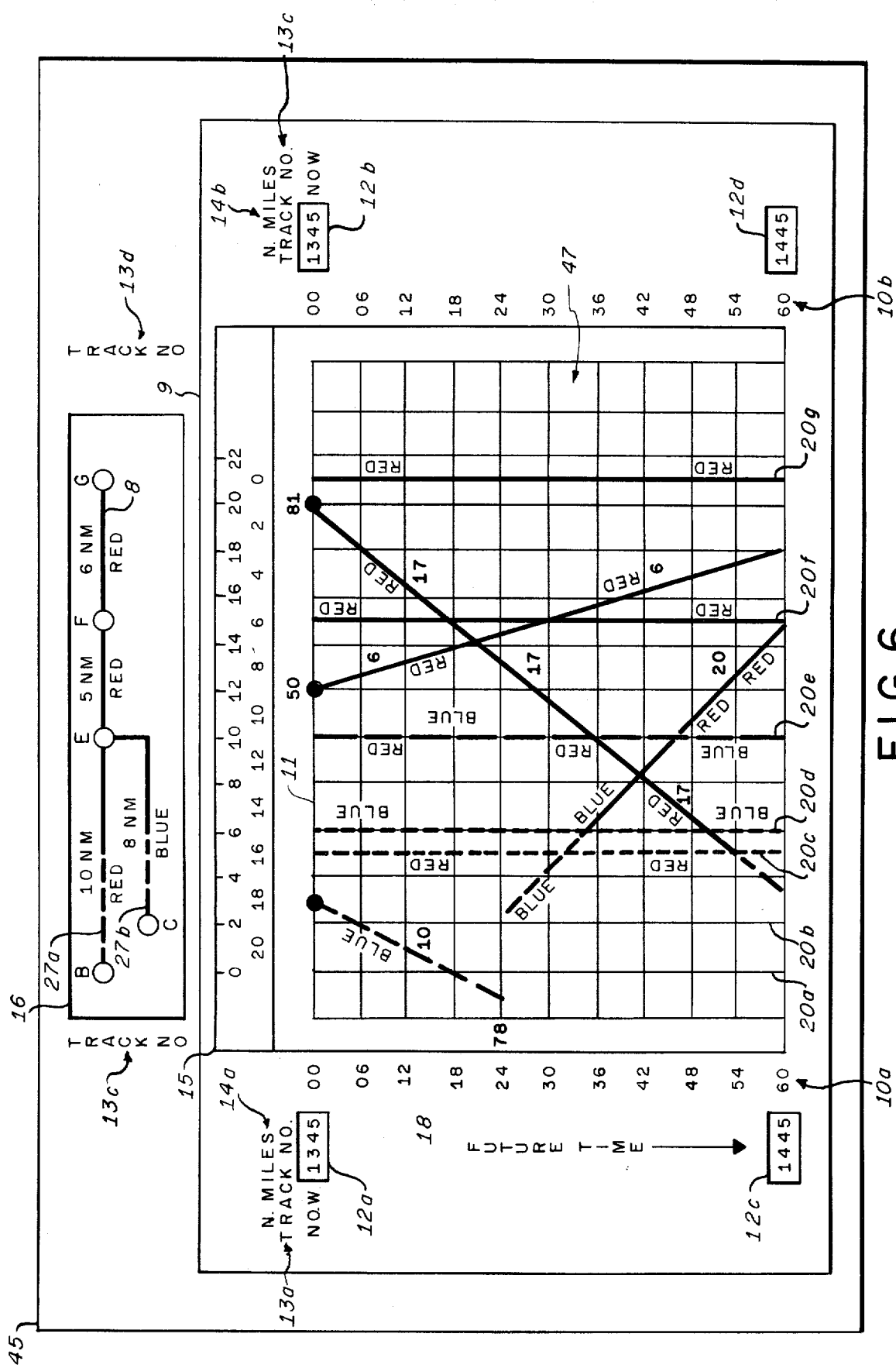

So far, navigation in a single, non-branching channel has been discussed. A more complex configuration with branching channels is illustrated in FIG. 6. Either the card 16 is again placed above display 9 and now schematically presents a view of the navigation channel path 8 or the display reproduces the same data under computer control following selection of the display area by the operator, indicating dividing channels at 27a and 27b. On the card 16 or other display area, where the lines B-E and C-E represent individual reaches, the left halves of lines 27a and 27b may be dotted to indicate that the channels to the left of points B and C may be under the separate control of a second surveillance operator observing a second display located beside the first. The end of each solid line thus represents a hand-over point in each channel at which operators transfer responsibility for monitoring marine traffic.

It will be noted, for example, that the schematic drawing placed on the card or display area 16 may be color or otherwise coded to ease interpretation with the reaches B to E to F to G in red and the reaches C to E in blue. The vessel track lines and certain grid lines in grid 47 may also be shown in corresponding colors. As the reaches B to E and C to E overlap in grid 47, the tracks would be difficult to keep separate in the operators' mind if not coded. In practice, the cathole ray display will preferably be coded and the track lines of vessels in the above examples of FIGS. 3, 4, and 5 would be shown in red, for example. When any two different vessels are sailing in different channels, they can meet only at the intersection of those channels. In FIG. 6, the way point or transfer point lines 20c, 20f, and 20g may be red, line 20d may be blue, and line 20e is made up of segments of alternating red and blue. In such a situation, vessels in blue channels can inercept vessels in red channels only in a precautionary area around way point E as represented by the dual color vertical line 20e.

Figure 7:
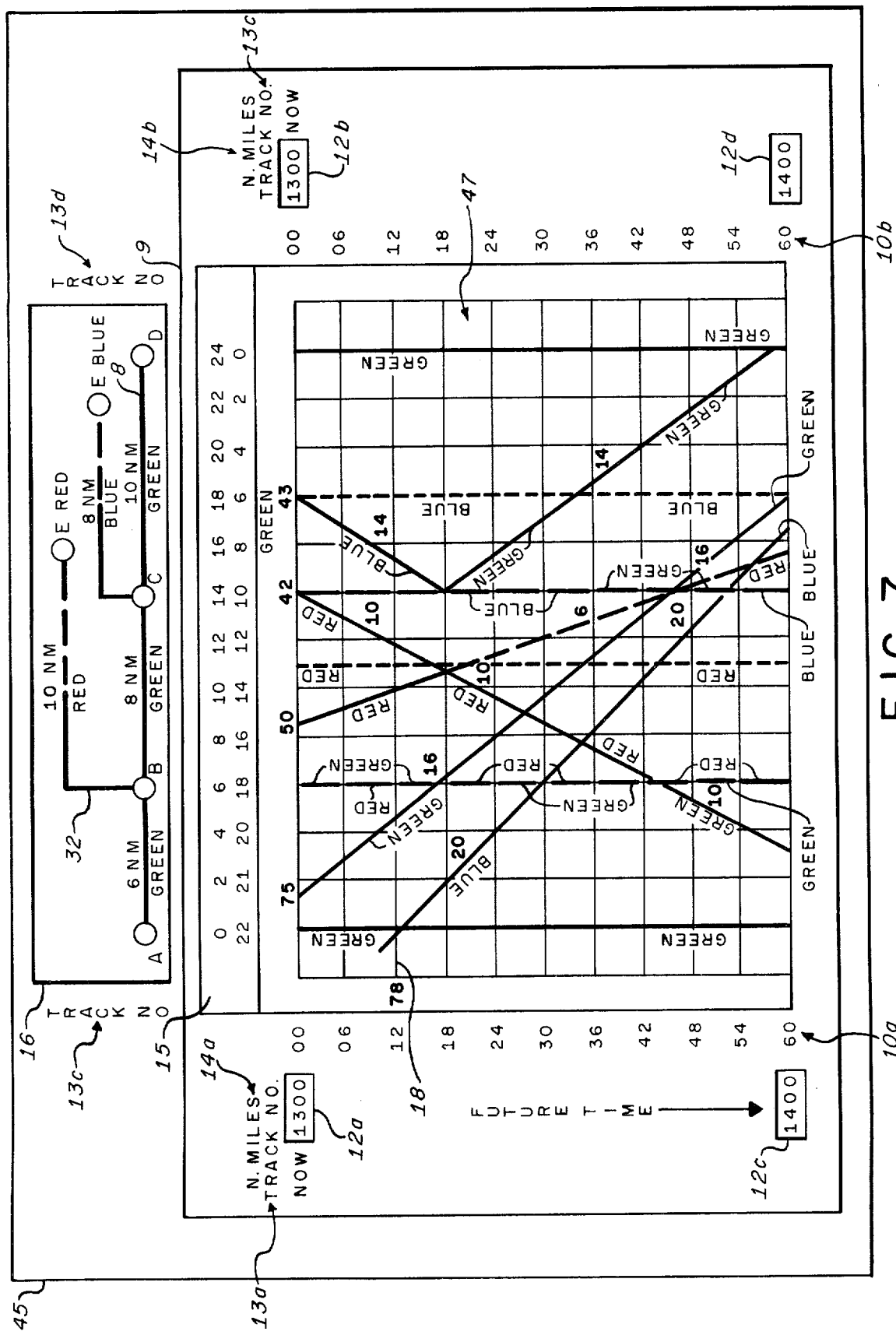

A further special problem arises in channels with delta connections of the type including reaches B to E and C to F in FIG. 1 and is considered in connection with FIG. 7. The complexity of this display arises because the reaches B-E and C-E are not of the same lengths so that the E end of reach B-E and the E end of reach C-E fall in different places in the estuary schematic presented by card 16 or other display area. They can, be kept separate in the operator's or operators' minds by naming the way point after the color of its channel in the schematic of card or display area 16, such as E Red at the end of the red channel reach B to E, and E Blue at the end of the blue channel reach C-E.

If the indicators of FIGS. 6 and 7 are set up as displays on opposite sides of a transfer point, it will be noted that the corresponding reaches have the same color in each display. As they cover different reaches of the estuary, the NOW time 12a and 12b indications are not the same. It is 45 minutes earlier in FIG. 7 than in FIG. 6, for example. In examining FIG. 7, it will be noted that a 14 knot target having blue track 43 has just passed the hand-over point and is now the responsibility of the operator associated with the FIG. 7 display. This target intends, when it passes through way point C, to turn to port to exit the system through the green channel to D. As a result, it will be represented by a solid line, first blue and then green. The different colors or dot patterns or other coding show that the vessel associated with the track number 78 entered the system from the open sea at way point A at 20 knots speed and intends to pass through way point B and to stay in the green channel to way point C to turn to port to leave the system through way point E. The vessels with track numbers 50 and 75 entered the channel, for example, at way point A and the track number 50 vessel intends to enter the harbor through the red channel E red, whereas the track number 75 vessel is passing by, expecting to leave the system at way point D.

In instrumenting the computer solutions of the foregoing equations 1 through 8, it will be understood by those skilled in the art that a variety of conventional computer arrangements may be employed in cooperation with a variety of conventional computer peripheral elements for this purpose. It is evident by inspection of the foregoing analysis that the solution of the equations thereby generated may be accomplished by any of several known methods, including the use of a cooperative assembly of known analog or digital data processing or computing circuits. For example, the several equations involve simple arithmetic operations such as addition, subtraction, multiplication, and division. Many examples of both analog and digital computation elements are available in the prior art for accomplishing computer operations and it is well known that they may readily be coupled together in cooperative relation for attaining desired results. It is furthermore evident that a conventional general purpose digital or analog computer may be employed for the purpose. It is obviously well within the ordinary skill of digital computer programmers to process the equations and logic discussed in the foregoing, to create flow charts, and to translate the latter into computer routines and sub-routines for solution of such equations along with a compatible computer language for processing input data and instructions to produce outputs directly useful for application, for example, in a standard cathode ray tube display.

FIG. 8 represents one possible instrumentation for practicing the invention and incorporating the novel conflict assessment display 45. As previously indicated, the system uses data derived, for example, by a conventional surface search radar system 56 of the type widely used in shipborne marine radar and at land based harbor surveillance applications and employing a directive azimuth-scanning antenna 56a. In the present invention, the radar antenna azimuth or bearing data and the detected target range data may be used to generate, in a conventional way, a type P or plan position presentation on the screen of what may be a substantially conventional cathode ray tube radar indicator. Thus, when the display 61 is a type P display, all targets in the vicinity of the radar system 56 indicated as located at position 66 on screen 44, are periodically intensified on screen 44. The targets vessels 42 and 43 represent two such targets at arbitrary locations. Additional targets will generally appear on display screen 44, along with reflections such as 41 from fixed obstacles, including land masses, if present. Variants of the regular type P display may be used, such as an offset type P display or others. Further, certain additional information such as the location of critical bottom contours defining natural or dredged channels or the locations of man made constraints such as traffic separation lanes may be added to the display. The data needed for describing these synthetic portions of the display may be stored in the memory of computer 55 in a conventional manner to be supplied via leads 62 and 63, for example, to the display 45 when the memory is interrogated. Other known types of storage techniques may be used such as those employing cathode ray storage tubes, over-lay maps, or rear-ported cathode ray tubes.

In this manner, traffic lane boundaries and traffic lane separation lines, such as shown in FIG. 1, may readily be displayed, as well as river channel underwater boundaries and other navigational data. By observation of the display provided by indicator 61, the harbor surveillance operator may easily determine if vessels transiting the displayed harbor area are correctly following paths prescribed through use of the present invention.

Radar system 56 and display 61 are operated in cooperation with track-while-scan system 60. Track-while-scan system 60, like radar system 56, is not necessarily a novel part of the novel system, as suitable devices for practicing its function are present in the prior art. Track-while-scan systems are of the general class of known devices for tracking grouped or interrupted data and the theoretical basis for such devices is explained by W. B. Jones and R. I. Hulsizer in Section 9.8 (page 378 et seq.) of Volume 20 of the Radiation Laboratory Series: "Electronic Time Measurements." Practical forms of these devices, which may be either analog or digital in instrumentation, are described in U.S. patents such as, for example, the White U.S. Pat. No. 2,849,707 for a "Position Correcting Means for Track-While-Scan Channels," issued Aug. 26, 1958, the Coveley U.s. Pat. No. 2,944,253 for a "Radar System and Display," issued July 5, 1960, the Close U.S. Pat. No. 3,064,250 for an "Automatic Track-While-Scan Channel," issued Nov. 13, 1962, and elsewhere.

According to prior practice, such devices as the manually operated optical pick up 64 have been used to enter coordinate data characterizing a selected target appearing on a type P or other cathode ray indicator screen 44 into storage in a track-while-scan device such as apparatus 60, where its rectangular or polar coordinates may be stored. Entry of the radar target coordinates may be accomplished by placing the conventional light-sensitive pick up or light-pen or other transducer 64 over the location of the selected target image. Such a pick up device is illustrated in use in the Frank U.S. Pat. No. 3,182,320, issued May 4, 1965, covering an "Automatic Range and Azimuth Track While Scan System." At the time that the target image is next intensified, an electrical pulse is automatically transmitted via lead 34 to track-while-scan system 60, which system also receives synchronizing and other signals via lead 39 from radar system 56.

The entry of target coordinates into the track-while-scan unit 60 may be completely automatic. Automatic lock-on in the conventional manner by apparatus 60 to signals received directly via conductor 39 from the receiver of radar unit 56 at the time the antenna 56a next sweeps past the selected target automatically corrects the stored positional data of the selected target after its initial entry until the operation is manually disabled. Thus, for example, coordinates $x$ and $y$ and rates $\dot{x}$ and $\dot{y}$ may be stored for any such target. Entry of a new target generates a second set of $x$, $y$, $\dot{x}$, and $\dot{y}$ data for storage within track-while-scan apparatus 60 for the newly selected target. Such stored $x$, $y$, $\dot{x}$, and $\dot{y}$ data may be stored in this manner for a plurality of intruding vessels for supply, upon demand, as on an automatic time shared basis, via leads 38 to computer 55.

As previously noted, track-while-scan apparatus 60 may be either of analog or digital nature and may be supplied, if required, in a conventional manner by suitable analog-to-digital or digital-to-analog converters as interface elements between various components of the system such as apparatus 60 and computer 55. It will be understood that track-while-scan apparatus 60 is actually a type of computer device in itself, performing arithmetic functions such as differentiation and storing data. It will therefore be understood that its function may be performed either in a discrete unit, such as in the separate apparatus 60, or that its arithmetic and storage or other operations may be performed at least in part by respective arithmetic and storage elements present in computer 55. The latter elements may perform other system functions in a conventional manner on a time sharing basis. The computer may, for example, be a commercially procurable UNIVAC 418 digital computer, or the like.

Referring again to FIG. 3, it will be seen that computer 55 has several computation and control functions to perform in generating the target track symbols on the indicator 45 of FIG. 8. It will now be further demonstrated how the system is constructed and how it operates to generate the target track lines 133, 134, 135, and 136 shown in FIG. 3. It will be appreciated that the stored $x$ and $y$ coordinates of the various target vessels are readiy available in the track-while-scan unit 60. Since the motions of each of the monitored ships are relatively small compared to the speed of even the simplest of computers, it is seen that it is not necessary to compute all of the data in real time; consequently, the threat or hazard data may be conveniently stored in the memory of computer 55 and is up-dated only periodically by track-while-scan system 60. Thus, there will normally be only small changes in the $x$ and $y$ coordinate data and therefore normally only small differences between the actual $x$ and $y$ coordinates of any monitored ship and the corresponding stored $x$ and $y$ coordinates derived by computer 55 from track-while-scan system 60. It will also be understood that the plurality of symbols such as those forming target track lines 133, 134, 135, and 136 of FIG. 3 may readily be generated on a time sharing or multiplexing basis using simple time sharing techniques well known in the analog and digital computer arts. In the same manner lines for defining the boundaries of the displayed precautionary areas are readily formed on display 9.

Referring now particularly to the apparatus for generating a target track line such as track line 133, it is apparent that the R and T coordinates of the point 37 in FIG. 3 substantially represent the location of a particular target vessel. The coordinates are denominated in terms of parameters R and T, but these are simply the analog names of the ship's true $x$ and $y$ coordinates. It will, of course, be understood by those skilled in the art that the discussion of the coordinates of point 37 in FIG. 3 and of the coordinate characteristic of other elements of the track line symbol 133 could equally well be discussed in the same manner in polar coordinates.

Computer 55 is synchronized by what may be a self-contained timing clock also dominating the remaining elements of the novel system and indicated as the real time digital clock 67. Thus, clock 67 represents a major system real time clock, determining the timing of computer 55 by the agency of signals transmitted to it via electrical lead 48. As will be seen, clock 67 transmits signals via leads 73, 81, and 82 for the synchronization of display 9, line symbol generator 59, and alphanumeric symbol generator 58 respectively. In what follows, the clock 67 will be seen to be the basic timer or clock control for the system.

It is apparent that computer 55 may be programmed so as periodically to derive from track-while-scan system 60 the R and T coordinates of the point 37 of FIG. 3, and to supply by well known means coordinate, color, and intensity values as control signals to display 45 via leads 83, 54 and 84 respectively, and thus to cause the cathode ray beam of indicator 9 to be instantaneously intensified so as to form a bright spot at point 37 of FIG. 3 of a particular color. If a particular color is commanded by the memory of computer 55 when it selects or is instructed or otherwise caused to select the track number 33 for display above the dot 37, the cathode ray tube screen of display 9 will include color phosphors in known arrangements such that the electron beam is positioned to actuate, for example, red phosphors. If a conventional penetration phosphor is employed, the electron beam when positioned will be accelerated at the particular voltage required to generate the desired color. The computer program will supply the necessary deflection and acceleration commands simultaneously, in the latter case.

A next succeeding function of computer 55 is to control the line symbol generator 59 by supplying command signals via leads 51, 51a, causing generator 59 to form the track line 133 of FIG. 3. As is seen from the foregoing analysis, the track line 133 is to be drawn from point 37 to a predicted point 35 at which the corresponding vessel is to leave the display 9. For this purpose, computer 55 successively applies, via leads 51, 51a, the coordinates of points 37 and 35 to the line symbol generator 59. The coordinate data for point 35 is, of course, predicted data, the computer 55 having used, in a conventional manner, the $x$, $y$, $\dot{x}$, and $\dot{y}$ of values of the monitored vessel to generate the predicted coordinates for point 35. The track line symbol generator 59 then supplies substantially instantaneously following the intensificaton of point 37, component sweep voltages via leads 71 and 72 for generating the target track line 133. At the same time as the intensification of point 37 and target track line 133, the computer 55 also supplies via lead 54 to display 9 the signal determining the color or colors, if used, in which the point 37 and line 133 are to be portrayed, as before. As will be understood, a plurality of such dots and lines may readily be drawn under control of computer 55 so as to represent the track lines of a number of monitored vessels and for displaying the boundaries of the displayed precautionary areas.

Analog or digital forms of apparatus for performing the function of the track line symbol generator 59 are well known in the art. Both in patents and other literature, there appears a substantial number of disclosures showing means for the generation, for instance, on a cathode ray tube screen, of a line of adjustable length, starting at any selected coordinate location on the cathode ray tube screen and ending at any other selected coordinate location on the cathode ray screen, and therefore lying at any arbitrary angle with respect to the operating coordinate system of the display.

In the like manner, by drawing upon sets of R and T coordinates stored in its own memory, the computer 55 may readily form the vertical and horizontal lines making up the index grid 47 and can similarly form the reference lines 19a, 19b, and 19c of FIG. 3, for example. Line segments are formed in the same manner by successive operation, so that the dual segment line 198b of FIG. 4 is readily generated, as well as the sides of parallelograms 29, 30, 31, 32. A simple arrangement which may be adapted to forming the target track line 133 appears, for example, in the J. E. Shepherd et al U.S. Pat. No. 2,406,858 for a "Visual Position and Phase Sense Indicator," issued Sept. 3, 1946 and assigned to the Sperry Rand Corporation.

Color display systems such as those employing penetration phosphors are also well known in the art, as illustrated in the D. H. Pritchard U.S. Pat. No.

3,204,143 for a "Penetration Color Screen, Color Tube, and Color Television Receiver," issued Aug. 31, 1965, and elsewhere.

The art of drawing lines is a highly exploited cathode ray tube art in the field of character displays. For example, many such character display circuits employ symbol generators in which the sweeping of the cathode ray beam in a repetitive scanning pattern is not employed. On the other hand, the method employed in such alpha-numeric symbol generators is that of assembling the symbol by a concatenation of successive electron beam traces. Generally, each succeeding trace begins at the point defined by the end of the immediately preceding trace. It will be apparent, in drawing usual alpha-numeric symbols, that the successive traces are generally vectored at changing angles. It is apparent that each such elemental trace is generated by apparatus which starts the trace at an arbitrary location on the cathode ray tube and ends the trace at another arbitrary location. Examples of such systems are found in the Bacon U.S. Pat. No. 3,325,802 for a "Complex Pattern Generation Apparatus," issued June 13, 1967, in the Dye U.S. Pat. No. 3,394,367 for a "Symbol Generator," issued July 23, 1968, in the Townsend U.S. Pat. No. 3,289,195 for a "Delay Line Wave Shape Generator," issued Nov. 29, 1966, and elsewhere.

It will also be appreciated that a variety of computer-controlled cathode ray tube displays are known in the art that are adaptable for use in practicing the invention. One such display is the subject of the U.S. Pat. No. 3,519,997, entitled "Planar Illustration Method and Apparatus," issued July 7, 1970 to W. D. Bernhart et al. Alternatively, an arrangement similar to the conventional computer-controlled cathode ray tube data terminal display may be adapted in practicing the invention. In such known arrangements, the central computer provides data to the terminal computer which, in turn, provides signals for generating alpha-numeric symbols on the cathode ray tube screen.

In a similar manner, the cathode ray tube display 9 of indicator 45 is completed when the computer 55 automatically generates the alpha-numeric characters forming the nautical mile scale 15, the vessel track numbers such as 33 and 34 in FIG. 3, and the various ship speed notations such as the numbers 15 at 57a and 57b in FIG. 3.

Each such symbol is drawn as discussed in the foregoing, the computer 55 sending appropriate commands to alpha-numeric generator 58 via leads 50, 52, 53. The coordinates at which the symbol is to be drawn are similarly supplied by computer 55 in a conventional manner through the agency of leads 74, 75. At the same time, computer 55 signals display 45 via lead 54 to determine the color in which the symbol is to be drawn and to intensify the trace via lead 84.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. Apparatus for the predictive display of the navigation characteristics of craft relative to at least first and second way points of a confined navigation channel with respect to time, at least one of said way points being characterized as a locality within which it is hazardous for craft to pass one another, comprising:
    fixed location sensor means for generating coordinate and velocity component data of craft with respect to said fixed location sensor means,
    computing means responsive to said coordinate and velocity component data for computing the predicted distance of travel of at least a first of said craft along said confined navigation channel with respect to said way points at a predetermined future time, and
    display means responsive to said computing means for displaying, in distance of travel and time coordinates, the present and predicted distance of travel and the corresponding present and future time coordinates of said first craft as first and second time-distance points on said display.

2. Apparatus as described in claim 1 wherein said sensor means comprises:
    azimuth scanning radar means for generating said coordinate data with respect to a fixed location,
    intermediate display means for displaying images corresponding to said coordinate data,
    transducer means for selectively generating electrical signals in response to said images, and
    means responsive to said electrical signals for automatically storing position and velocity data characterizing at least one of said craft.

3. Apparatus as described in claim 1 wherein:
    said computing means is additionally responsive to said coordinate and velocity component data and to control means for computing the predicted distance of travel of at least a second craft along said confined navigational channel with respect to said way points at a second future time, and
    said display means is additionally responsive to said computing means and to said control means for displaying in distance of travel and time coordinates, the present and predicted distance of travel and corresponding present and future time coordinates of said second craft as third and fourth corresponding time-distance points on said display.

4. Apparatus as described in claim 1 additionally including line symbol generator means responsive to said computing means for generating a first connecting line between said first and second time-distance points of said display and for generating a first reference line at the locus corresponding to the distance along said channel of at least one of said way points and extending from present time at least to said future time, said first connecting line and said first reference line forming a first intersection to predict the time at which said first craft will be substantially centrally located at one of said way points.

5. The method of predictive display of navigation characteristics of craft relative to at least first and second way points of a confined navigation channel with respect to time, at least one of said way points being characterized as a locality within which it is hazardous for craft to pass one another, including the steps of:
    generating coordinate and velocity component data of craft with respect to fixed location sensor means,
    employing said coordinate and velocity component data for computing the predicted distance of travel of at least a first of said craft along said confined navigation channel with respect to said way points at a predetermined future time, and displaying, in distance of travel and time coordinates, the present and predicted distance of travel and the corresponding present and future time coordinates of said first craft as first and second time-distance points on said display.

6. The method of predictive display of claim 5 including the further steps of:
generating a first line between said first and second time distance points on said display, and
generating a first reference line at the locus corresponding to the distance along said channel of at least one of said way points and extending from present time at least to said future time, whereby said connecting line and said first reference line form a first intersection to predict the time at which said first craft will be substantially centrally located at one of said way points.

7. The method of predictive display of claim 6 including the further steps of:
employing said coordinate and velocity component data for computing the predicted distance of travel of at least a second craft along said confined navigational channel with respect to said way points at a second future time, and
displaying in distance of travel an time coordinates, the present and predicted distance of travel and corresponding present and future time coordinates of said second craft as third and fourth corresponding time-distance points on said display.

8. The method of predictive display of claim 7 including the further step of generating a second connecting line between said third and fourth time-distance points on said display causing said second connecting line and said first reference line to form a second intersection to predict the time at which said second craft will be substantially centrally located at said one of said way points, thereby predicting the undesired passage of said first and second craft within at least one of said way points.

9. The method of predictive display of claim 8 including the further step of generating at least a second straight reference line on said display at a locus corresponding to the distance along said channel of a second of said way points, said line extending from present time toward a predetermined future time for purposes analogous to the purposes of said first straight reference line.

10. The method of predictive display of claim 9 including the steps of calculating and storing at least a first safety dimension representative of at least a first precautionary area including said first intersection.

11. The method of predictive display of claims 9 including the further steps of calculating and storing first and second safety dimensions respectively representative of first and second precautionary areas respectively including said first and second intersections.

12. The method of predictive display of claim 11 including the further steps of:
comparing the values of said first and second stored dimensions, and
providing an alarm response output if said values are related in a predetermined manner for predicting the undesired passage of said first and second craft within at least one of said way points.

13. The method of predictive display of claim 12 including the further step of displaying said first and second precautionary areas in response to said alarm response output at said first and second intersections whereby the operator may observe them in overlapping relation.

* * * * *